(12) United States Patent
Singh et al.

(10) Patent No.: US 8,707,334 B2
(45) Date of Patent: Apr. 22, 2014

(54) COMPUTER SYSTEM EVENT DETECTION AND TARGETED ASSISTANCE

(75) Inventors: Ram P Singh, Sammamish, WA (US); Sandeep S Sahasrabudhe, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1443 days.

(21) Appl. No.: 12/124,139

(22) Filed: May 20, 2008

(65) Prior Publication Data
US 2009/0293067 A1   Nov. 26, 2009

(51) Int. Cl.
G06F 3/00 (2006.01)
G06F 9/44 (2006.01)
G06F 9/46 (2006.01)
G06F 13/00 (2006.01)

(52) U.S. Cl.
USPC ......................................................... 719/318

(58) Field of Classification Search
None
See application file for complete search history.

(56) References Cited

U.S. PATENT DOCUMENTS

| | | | |
|---|---|---|---|
| 6,507,852 B1 * | 1/2003 | Dempsey et al. .................... 1/1 |
| 6,629,134 B2 | 9/2003 | Hayward et al. |
| 7,092,987 B2 | 8/2006 | Brittingham et al. |
| 7,117,355 B2 | 10/2006 | Zomaya et al. |
| 7,216,951 B2 | 5/2007 | Garrana et al. |
| 7,702,318 B2 * | 4/2010 | Ramer et al. ............... 455/414.2 |
| 7,818,674 B2 * | 10/2010 | Koch ............................. 715/736 |
| 2001/0001146 A1 | 5/2001 | Petersen |
| 2002/0026324 A1 | 2/2002 | Okada |
| 2004/0186598 A1 | 9/2004 | Tanaka |
| 2005/0125281 A1 | 6/2005 | Henrickson et al. |
| 2006/0241958 A1 | 10/2006 | Blanchard et al. |
| 2006/0242017 A1 * | 10/2006 | Libes et al. ...................... 705/14 |
| 2007/0067267 A1 * | 3/2007 | Ives .................................. 707/3 |
| 2007/0168539 A1 | 7/2007 | Day |
| 2007/0271370 A1 * | 11/2007 | Kehl ............................. 709/224 |
| 2008/0270228 A1 * | 10/2008 | Dasdan .......................... 705/14 |

OTHER PUBLICATIONS

"Dell Photo All-in-One Printer 964", 2005, Dell Computer Corporation, pp. 2.

* cited by examiner

*Primary Examiner* — Emerson Puente
*Assistant Examiner* — Kimbleann Verdi
(74) *Attorney, Agent, or Firm* — Louise Bowman; Jim Ross; Micky Minhas (57) ABSTRACT

A computer event is detected and a notification is displayed. If a dialog box corresponding to the computer event triggered the event detection, then the dialog box is modified to include further details of the event and an assistance control that links to a search engine Web page. If a dialog box did not trigger the event detection, then a dialog box is displayed with the event details and assistance control. Upon selection of the assistance control, the search engine Web page is displayed with event details pre-populated in the search term field. Targeted advertisements are displayed according to bidding on a unique descriptor associated with the specific computer event.

17 Claims, 5 Drawing Sheets

COMPUTER SYSTEM EVENT DETECTION AND TARGETED ASSISTANCE

BACKGROUND

Whenever a computer system experiences a hardware or software problem, the user of the computer system typically takes action to personally resolve the issue or to seek assistance in resolving the issue. Often, the user is able to quickly identify an issue and easily resolve it. For example, a failure to print may be as simple as installing paper into an attached printer. Other times, when the specific issue or resolution is not as clear, the user must seek assistance. There are various ways in which computer users seek assistance. For example, the user may call a help center to speak to a technician about the problem. The user may alternatively initiate a conversation with a technician via electronic mail, instant messaging, or other electronic messaging systems.

Often, a user will research the particular problem by typing any number of chosen keywords as search terms into a search engine World Wide Web (Web) page in an attempt to retrieve information regarding the failure and corresponding solutions. However, when the user enters search terms, the relevance of the search results is entirely dependent upon the quality of the search terms. In other words, if the user types in terms that generally describe the issue, then a large number of marginally relevant results are likely to be returned. If the user does not fully understand the issue, or does not have or utilize details of the issue when choosing search terms, then the results are not likely to be highly relevant, and the likelihood that the user will discover a valid solution is low.

Many search engines will provide any number of advertisements on the Web page along with the search results. These advertisements may be chosen according to the search terms entered by the user in an effort to provide advertisements that are more targeted to the user and the material that is being requested by the user. However, similar to the search results returned by the search engine, the relevance of the selected advertisements correlates to the quality of the search terms being entered by the user. If the computer hardware or software issue is not fully understood by the user, then the search terms used might not result in the most applicable advertisements being displayed on the Web page, reducing an opportunity for an advertiser to make a sale and conversely for the user to purchase a good or service that can help resolve the issue.

It is with respect to these considerations and others that the disclosure made herein is presented.

SUMMARY

Technologies are described herein for providing targeted assistance for a computer event. In particular, the disclosure provided herein provides for the detection of a computer system event, notification to a user that the event has occurred, and event-specific search terms and advertisements, allowing a computer user to receive applicable, targeted options for correcting computer issues associated with the detected event.

According to one aspect presented herein, a computer system event is detected and a user interface is provided to the user to notify the user of the event and to receive a user input corresponding to a request for assistance with the event. When the request for assistance is received via the user interface, an address for a search engine Web page is provided to a Web browser along with search terms that are specifically targeted to the detected event and a unique descriptor associated with the detected event. The search terms are used to populate the search field of the search engine Web page to provide a targeted search that is likely to result in highly relevant search results. The unique descriptor is bid on by advertisers who are interested in providing targeted advertisements to a user with a very specific need.

According to one implementation, the computer system event is detected by determining that an event notification dialog box is being displayed by an operating system or third party application that is running on the computing device. An example includes the detection of an error pop-up dialog box that is displayed for the user when the operating system or executing software determines that an error has occurred. Other implementations detect a computer system event that is independent of an error pop-up dialog box and may include determining that the detected event is one of a number of similar events that have occurred within a threshold period of time.

According to another aspect of the disclosure provided herein, a uniform resource locator (URL) is created upon receiving the user input requesting assistance with the detected computer system event. The URL includes an address for navigating to the search engine Web page, a description of the computer system event to be used to provide targeted search terms, and the unique descriptor for selecting advertisements for display on the Web page according to the results of an auction bidding process in which the interested advertisers bid on the unique descriptor. The URL is utilized by a Web browser on the computing device to launch the search engine Web page, populate the search field with applicable search terms, and provide targeted advertising.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for detecting computer system events, notifying a user of the detected events, and providing targeted, event-specific assistance to the user to resolve the detected events. Through the use of the technologies and concepts presented herein, a user of a computer system or other computing device is made aware of issues or events relating to hardware and/or software of the computer system and is provided with improved tools for handling the issues.

Specifically, as a computer system event occurs, an event response agent executing on the computing device experiencing the computer system event detects and notifies the user. The notification includes controls that allow the user to initiate a search for specific information relating to the detected event, increasing the likelihood that the results of the search will be useful to the user. Moreover, embodiments provided herein allow for advertisers to bid on unique descriptors associated with specific computer system events, rather than on more general keywords. Doing so enables highly targeted advertisements to be matched with the search query according to the unique descriptor associated with the detected computer system event. Targeting advertising in this manner is beneficial to both advertisers and users since displaying event-specific advertisements increases the likelihood of a sale, which provides revenue for the advertiser and an efficient event resolution for the user.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for detecting computer system events and providing assistance to resolve the events will be described. Throughout this disclosure, the term "computer system event" is used to describe any detectable issue with a given computer system or computing device. An event may include a software or hardware error or failure, such as a hard disk drive error. An event may also be consumption of a replenishable component, including but not limited to a low level of printer ink or paper.

Figure 1:
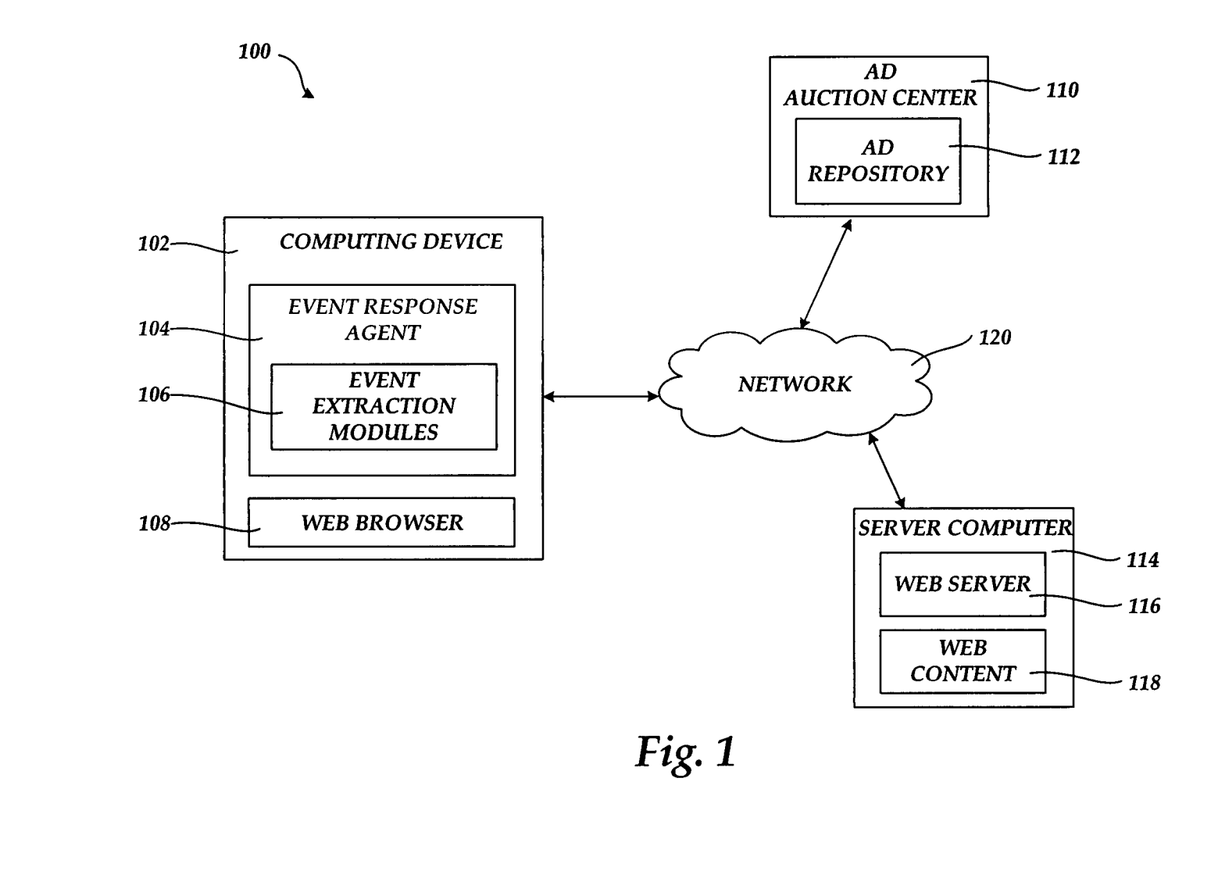
FIG. 1 is a network diagram showing aspects of an illustrative operating environment and several software components provided by the embodiments presented herein.

Turning now to FIG. 1, details will be provided regarding an illustrative operating environment and several software components provided by the embodiments presented herein.

In particular, FIG. 1 shows aspects of a system 100 for detecting, notifying, and providing assistance with respect to computer system errors. The system 100 includes a computing device 102. The computing device 102 may be any electronic device capable of running applications. Examples include but are not limited to a personal computer, a server computer, a personal data assistant, a cellular telephone, and a video game console.

According to one embodiment, the computing device 102 illustrated in FIG. 1 comprises a standard desktop or laptop computer system capable of executing an operating system and one or more application programs. In particular, according to embodiments, the computing device 102 is operative to execute an event response agent 104. The event response agent 104 may be an application program, program module, or set of application programs or program modules that perform the various processes according to the embodiments described herein.

The event response agent 104 may include or work in conjunction with a set of event extraction modules 106. As will be described in greater detail below with respect to FIGS. 2-4, the event extraction modules 106 include any number of program modules, each operative to detect a particular type of computer system event. The computing device 102 also includes a Web browser 108. As will be described below, the Web browser 108 receives Web content 118 from a Web server 116 operating on a server computer 114. The Web content 118 includes search results from a targeted query corresponding to a particular computer system event.

The Web browser 108 additionally renders advertisements selected from an advertisement repository 112 as a result of an auction or bidding process, or otherwise purchasing advertising space on a search engine Web page according to specific unique descriptors that correspond to specific computer system events. According to various embodiments, the bidding on the unique descriptors is managed at an advertisement auction center 110. It should be appreciated that the advertisement repository 112 may be a part of the advertisement auction center 110, may be directly connected to the advertisement auction center 110, or may be remotely connected to the advertisement auction center 110.

According to one embodiment, the advertisement repository 112 may be located within the computing device 102 such that the advertisement selection process occurs at the computing device 102 using logic within the event response agent 104 and/or the event extraction modules 106. As illustrated in FIG. 1, the computing device 102, the advertisement auction center 110, and the server computer 114 are interconnected through one or more local and wide area networks, such as the network 120. It should be appreciated that many more network connections may be utilized than illustrated in FIG. 1.

Figure 2:
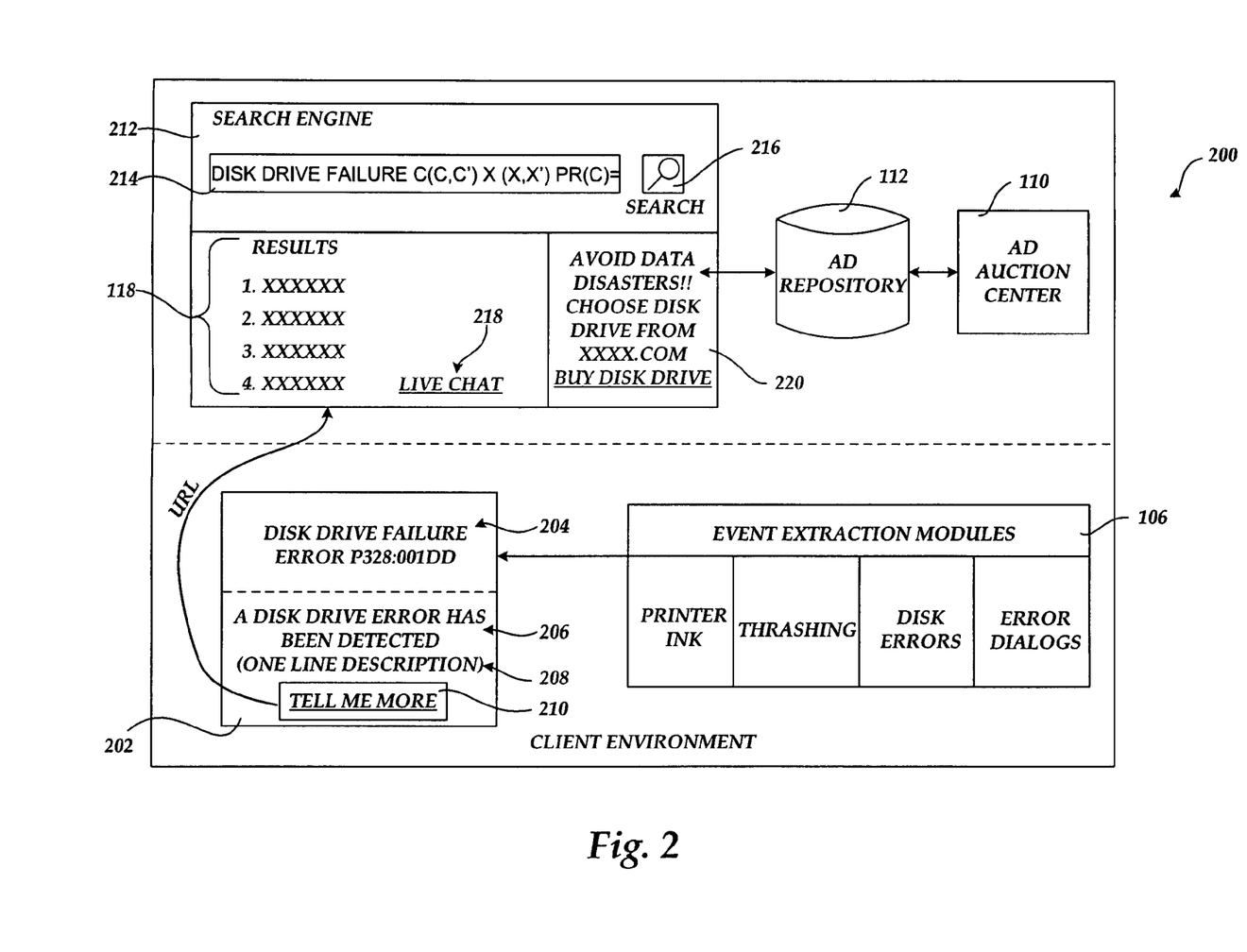
FIG. 2 is a block diagram showing an illustrative example of a computer system event detection, notification, and support system in which an event notification dialog box is detected and modified to provide targeted assistance to a user according to various embodiments presented herein.

FIG. 2 illustrates a computer system event detection, notification, and support system 200 according to various embodiments presented herein. According to the example shown in FIG. 2, a number of event extraction modules 106 reside in a client computer environment, specifically running on the computing device 102. Although only four event extraction modules 106 are shown in FIG. 2 for illustration purposes, it should be understood that there may be any number of event extraction modules 106 that detect any type of computer system events. In the example shown, a printer ink event extraction module 106 is capable of detecting when one or more ink cartridges contain a quantity of ink below a predetermined threshold. When this occurs, the user of the computing device 102 will be notified as described below.

A thrashing event extraction module 106 might detect when the computing device 102 is experiencing a thrashing issue for a threshold length of time or an threshold number of thrashing issues within a set length of time. The criteria or thresholds for detection may be programmed into the thrashing event extraction module 106 and used to determine if a notification is proper. Similarly, a disk error event extraction module 106 determines when disk errors occur or occur with excessive frequency. An error dialog box event extraction module 106 detects when an event notification dialog box is provided by the operating system of the computing device 102 or by an application executing on the computing device 102.

FIG. 2 illustrates an embodiment in which one or more event extraction modules 106 detect an event notification dialog box 202 provided by the operating system or third-party application. In this example, the initial event notification dialog box 202 may include the error notification 204 as seen above the broken line in the event notification dialog box 202 that warns the user of a disk drive failure. Without more information, the user might not understand the disk drive failure and may not receive highly relevant search results if a search engine were used to search for potential resolutions, even if the specific error code given were used as a search term since the error code may broadly describe a category of disk drive failures.

However, according to embodiments presented herein, the disk error event extraction module 106 modifies the event notification dialog box 202 to include a clear notification 206, a description 208 of the error, and a selectable assistance request button 210. It should be appreciated that more or less information may be provided within the event notification dialog box 202 by the applicable event extraction module 106. The description 208 includes details regarding the computer system event that may be used to populate a search term field 214 of a search engine Web page 212 as described below. The details within the description 208 may be obtained by the applicable event extraction module 106 through direct detection of the computer system event or from the operating system or application that detected the computer system event and provided the event notification dialog box 202.

If the user determines that more information is needed in order to resolve the computer system event, he or she may select the assistance request button 210. According to various embodiments, when the assistance request button 210 is selected, the event response agent 104 creates a URL that may be used by the Web browser 108 and any other components of the system 100 to navigate to a search engine Web page 212, populate the search term field 214, and select targeted advertisements 220 for display on the search engine Web page 212.

The URL includes a predetermined address for a search engine Web page, such as www.live.com corresponding to LIVE SEARCH by Microsoft Corporation of Redmond Wash. The URL additionally contains a parameter corresponding to the applicable search query. This search terms for this query may come from the description 208 created by the corresponding event extraction module 106. An additional parameter within the URL includes the unique descriptor corresponding to the computer system event. As described briefly above, this descriptor is used to receive bids from advertisers for the opportunity to provide advertisements targeted to specific events.

According to the example shown in FIG. 2, an auction occurs at the advertisement auction center 110 to accept bids for a unique descriptor associated with a particular disk drive error. Bids may be accepted at a particular time, at periodic times, or in real time. When the URL is received and the search engine Web page 212 is rendered, an advertisement 220 must be selected for display. According to various embodiments, the advertisement auction center 110 is referenced to determine which advertiser and associated advertisement 220 should be selected according to the highest bid for the unique descriptor associated with the particular computer system event that is being queried at the search engine Web page 212. It should be appreciated that the disclosure is not limited to the highest bid. Rather any quantity and type of criteria may be used to select an advertisement 220 associated with the unique descriptor and corresponding computer system event. Once an advertisement 220 has been selected, it is retrieved from the advertisement repository 112 and displayed on the search engine Web page 212.

As described above, the search term field 214 of the search engine Web page 212 is pre-populated with the targeted search terms from the description 208. Doing so allows a much more directed query than if the user were to choose and manually enter keywords. After selecting the search control 216, the Web content 118, or search results, are displayed for the user in order of relevance. The user now has the option of obtaining further information from the links provided in the search results or by selecting a link associated with the advertisement 220. According to one embodiment, the search engine Web page 212 additionally includes a chat link 218 that, when selected, initiates a textual or verbal conversation with a live technician.

Figure 3:
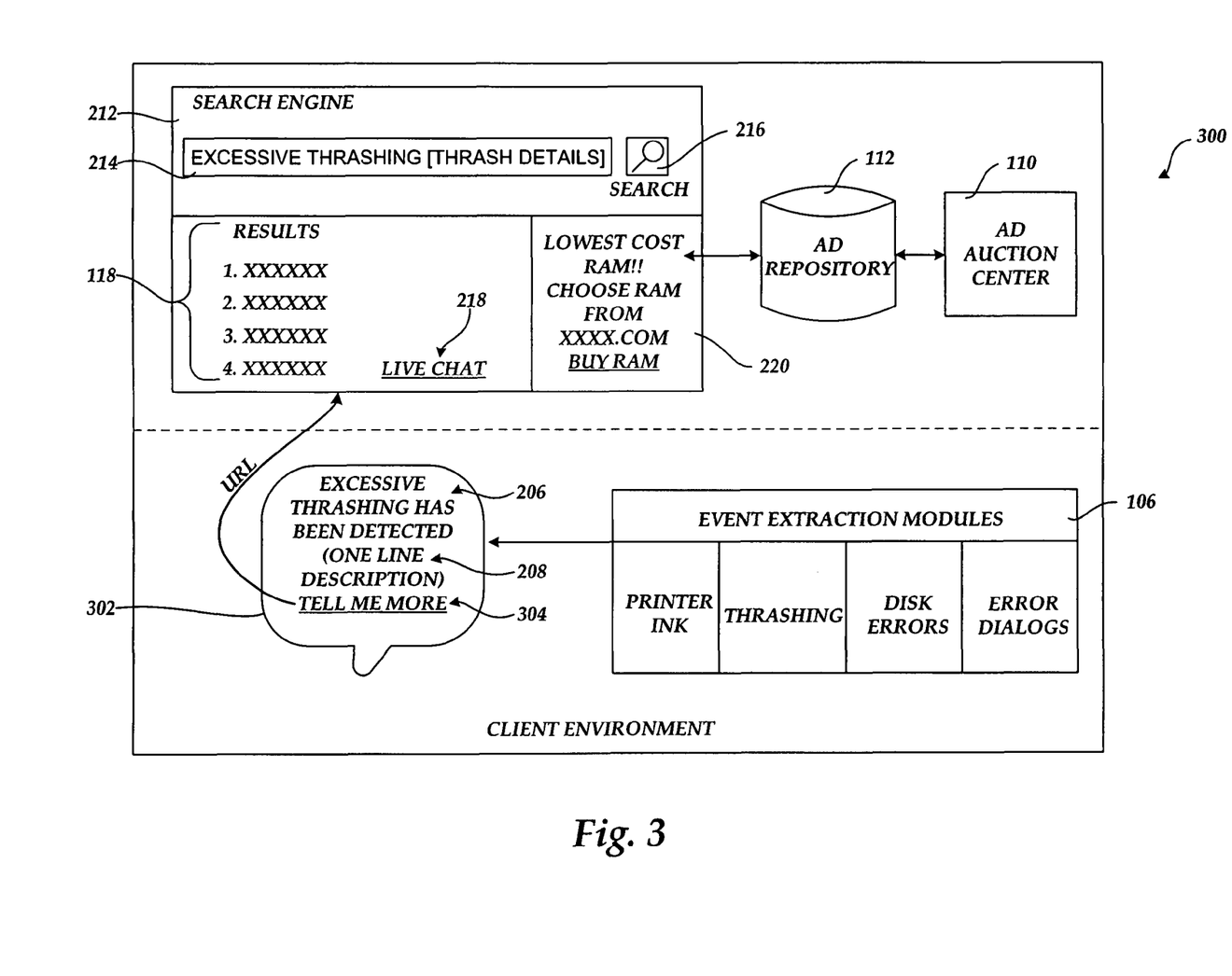
FIG. 3 is a block diagram showing an illustrative example of a computer system event detection, notification, and support system in which an event assistance dialog box is displayed upon the detection of computer system events to provide targeted assistance to a user according to various embodiments presented herein.

Turning to FIG. 3, a computer system event detection, notification, and support system 300 will be explained. The example shown in FIG. 3 is similar to that explained above with respect to FIG. 2. The difference, however, is that rather than detecting an existing event notification dialog box 202, the applicable event extraction module 106 detects an event or series of events and displays an event assistance dialog box 302. For example, the thrashing event extraction module 106 may detect a number of thrashing events that exceeds a pre-programmed threshold number of events or exceeds a threshold number of events in a given period of time. As a result, the thrashing event extraction module 106 displays the event assistance dialog box 302. The contents of the event assistance dialog box 302 are similar to those of the event notification dialog box 202 described above. In this example, instead of the assistance request button 210, the thrashing event extraction module 106 provides an assistance request hyperlink 304. It should be appreciated that any type of button, hyperlink, or other assistance control may be used to initiate the creation of the URL and subsequent navigation to the search engine Web page 212.

Figure 4:
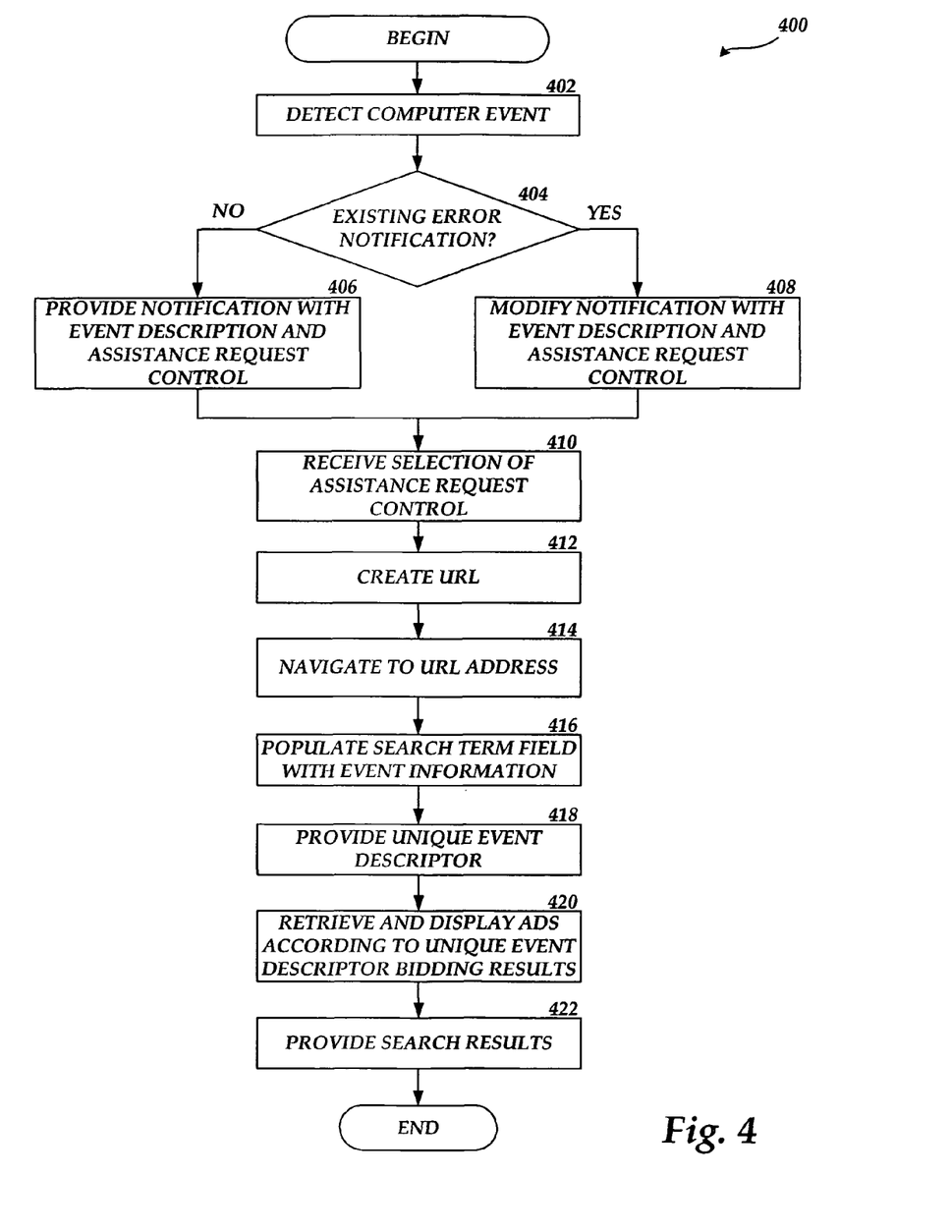
FIG. 4 is a flow diagram illustrating a method for detecting computer system events, as well as notifying and assisting a user with respect to the detected events according to various embodiments described herein.

Referring now to FIG. 4, additional details will be provided regarding the embodiments presented herein for detecting computer system events and providing notification and assistance. In particular, FIG. 4 is a flow diagram illustrating aspects of the operation of the event response agent 104 and Web browser 108 of the computing device 102, in conjunction with the server computer 114 and advertisement auction center 110.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 400 begins at operation 402, where the applicable event extraction module 106 detects a computer system event. As described above, this event detection may be made directly by the event extraction module 106 or through detecting a corresponding event notification dialog box 202. From operation 402, the routine 400 continues to operation 404, where a determination is made as to whether the event detection is made from an event notification dialog box 202. If the detection was not made from an existing event notification dialog box 202, then the routine 400 proceeds to operation 406, where an event assistance dialog box 302 is displayed, including a description 208 of the computer system event and an assistance request control such as an assistance request button 210 or an assistance request hyperlink 304. The routine 400 then proceeds to operation 410 and continues as described below.

However, if it is determined at operation 404 that the detection was made from an existing event notification dialog box 202, then the routine 400 proceeds to operation 408, where the event notification dialog box 202 is modified to include a description 208 of the event that includes additional event detail, as well as to include an assistance request control. The routine 400 proceeds from operation 408 to operation 410, where a user selection of the assistance request control is received. At operation 412, the URL containing an address for the search engine Web page 212, the parameter corresponding to the targeted search query, and the parameter corresponding to the unique descriptor associated with the computer system event, is created.

From operation 412, the routine 400 continues to operation 414, where the Web browser 108 utilizes the URL to navigate to and render the search engine Web page 212. The routine continues to operation 416, where the targeted search terms are extracted from the URL and populated into the search term field 214 of the search engine Web page 212. The unique descriptor is extracted from the URL at operation 418 and utilized to select one or more advertisements 220 according to bidding results at the advertisement auction center 110. From operation 418, the routine 400 continues to operation 420, where the selected advertisements are retrieved from the advertisement repository 112 and displayed on the search engine Web page 212. At operation 422, the search results are then displayed for the user and the routine 400 ends.

Figure 5:
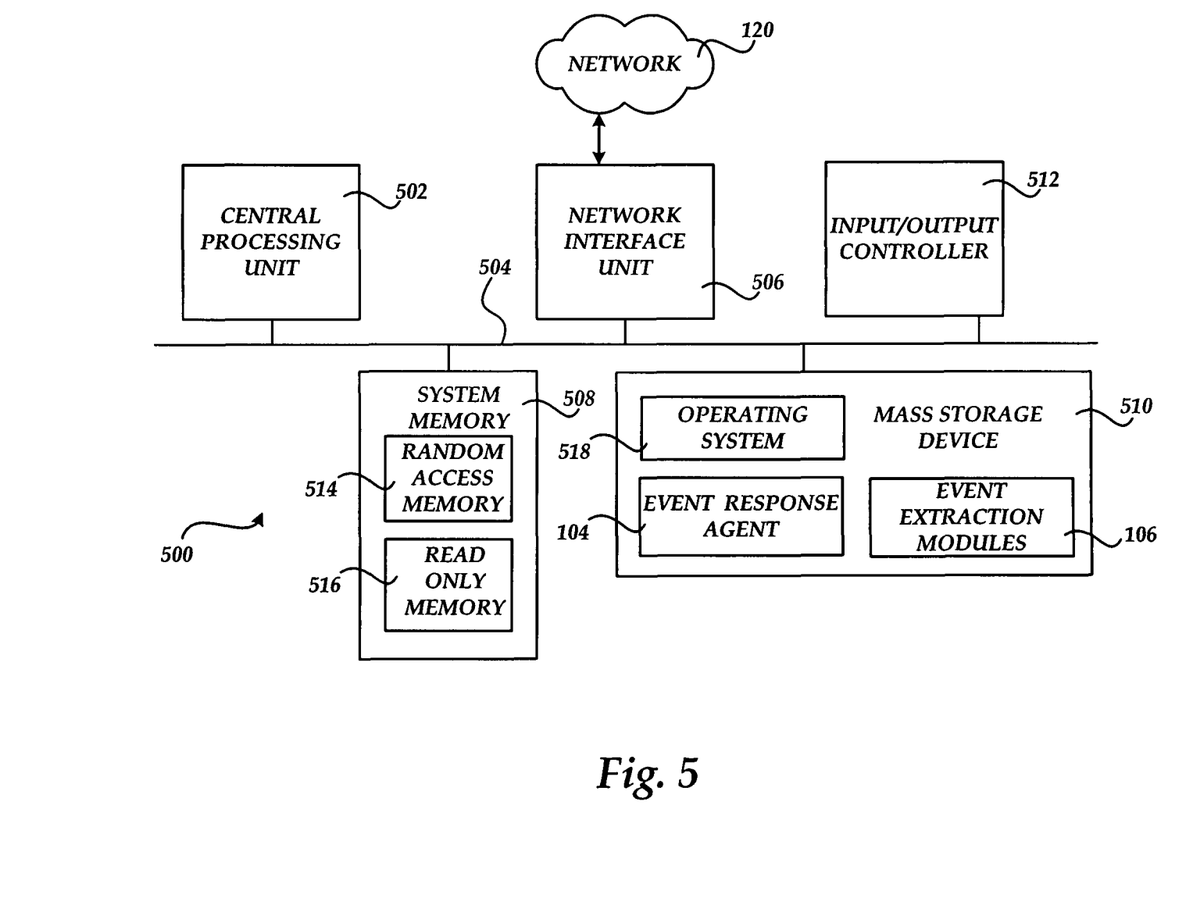
FIG. 5 is a computer architecture diagram showing an illustrative computer hardware and software architecture for a computing system capable of implementing aspects of the embodiments presented herein.

FIG. 5 shows an illustrative computer architecture for a computer 500 capable of executing the software components described herein for detecting computer system events and providing assistance in the manner presented above. The computer architecture shown in FIG. 5 illustrates a conventional desktop, laptop, or server computer and may be utilized to execute any aspects of the software components presented herein described as executing on the computing device 102, the server computer 114, or at the advertising auction center 110.

The computer architecture shown in FIG. 5 includes a central processing unit 502 (CPU), a system memory 508, including a random access memory 514 (RAM) and a read-only memory (ROM) 516, and a system bus 504 that couples the memory to the CPU 502. A basic input/output system containing the basic routines that help to transfer information between elements within the computer 500, such as during startup, is stored in the ROM 516. The computer 500 further includes a mass storage device 510 for storing an operating system 518, application programs, and other program modules, which are described in greater detail herein.

The mass storage device 510 is connected to the CPU 502 through a mass storage controller (not shown) connected to the bus 504. The mass storage device 510 and its associated computer-readable media provide non-volatile storage for the computer 500. Although the description of computer-readable media contained herein refers to a mass storage device, such as a hard disk or CD-ROM drive, it should be appreciated by those skilled in the art that computer-readable media can be any available computer storage media that can be accessed by the computer 500.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer 500.

According to various embodiments, the computer 500 may operate in a networked environment using logical connections to remote computers through a network such as the network 120. The computer 500 may connect to the network 120 through a network interface unit 506 connected to the bus 504. It should be appreciated that the network interface unit 506 may also be utilized to connect to other types of networks and remote computer systems. The computer 500 may also include an input/output controller 512 for receiving and processing input from a number of other devices, including a keyboard, mouse, or electronic stylus (not shown in FIG. 5). Similarly, an input/output controller may provide output to a display screen, a printer, or other type of output device (also not shown in FIG. 5).

As mentioned briefly above, a number of program modules and data files may be stored in the mass storage device 510 and RAM 514 of the computer 500, including an operating system 518 suitable for controlling the operation of a networked desktop, laptop, or server computer. The mass storage device 510 and RAM 514 may also store one or more program modules. In particular, the mass storage device 510 and the RAM 514 may store the event response agent 104 and the event extraction modules 106, each of which was described in detail above with respect to FIGS. 1-4. The mass storage device 510 and the RAM 514 may also store other types of program modules.

Based on the foregoing, it should be appreciated that technologies for detecting computer system events, providing notification of the events, and providing assistance in resolving the computer system events are provided herein. Utilizing the embodiments described herein, a user is able to receive a detailed notification regarding any detected computer system event. If the user is requires additional information, the embodiments described above provide the user with an assistance request control that with a single click, opens a search engine Web page 212 that is pre-populated with detailed, relevant search terms that are likely to produce a list of search results that are much more relevant than results returned from a general search using search terms selected by the user.

Additionally, the embodiments disclosed herein provide for one or more targeted advertisements 220 that are the result of bidding on a unique descriptor that is directly associated with the computer system event experienced by the user. As a result, the advertisements are narrowly targeted in a manner that increases the likelihood of a sale for the advertiser and a solution for the user.

Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for providing support for a computer system event on a computing device, the method comprising:
   detecting the computer system event by detecting an event notification dialog box displayed by an operating system or third party application executing on the computing device;
   in response to detecting the computer system event, providing a user interface corresponding to the computer system event by modifying the event notification dialog box to display a selectable assistance request button on the event notification dialog box that is operative to submit a user input corresponding to a request for assistance with the computer system event;
   receiving the user input via the user interface corresponding to the request for assistance with the computer system event;
   in response to receiving the user input corresponding to the request for assistance with the computer system event, providing a World Wide Web (Web) browser with an address corresponding to a Web page associated with a search engine, a plurality of targeted search terms for the search engine corresponding to the computer system event for populating a search term field of the Web page, and a unique descriptor corresponding to the computer system event for targeting an advertisement from at least one advertiser to be displayed in a search result of the search engine, wherein the address corresponding to the Web page associated with the search engine, the plurality of targeted search terms corresponding to the computer system event for populating the search term field of the Web page, and the unique descriptor corresponding to the computer system event for targeting the advertisement to be displayed are provided to the Web browser in a uniform resource locator (URL) created upon receiving the user input via the user interface corresponding to the request for assistance with the computer system event.

2. The method of claim 1, wherein detecting the computer system event comprises:
   detecting the computer system event;
   determining that the computer system event comprises one of a plurality of like computer system events;
   determining that the plurality of like computer system events exceed a threshold number of events in a given period of time; and
   in response to determining that the plurality of like computer system events exceed a threshold number of events in a given period of time, providing the user interface comprising an event assistance dialog box.

3. The method of claim 1, further comprising displaying the Web page associated with the search engine, wherein the Web page comprises a search field that is populated with the plurality of search terms and wherein the advertisement is associated with an entity providing a bid on the unique descriptor.

4. The method of claim 3, further comprising:
   receiving a selection of a search control;
   retrieving web content corresponding to the plurality of search terms; and
   displaying a plurality of links corresponding to the web content.

5. An optical disk, a magnetic storage device, or a solid state storage device having computer executable instructions stored thereon which, when executed by a computer, cause the computer to:
   detect a computer system event on a computing device;
   in response to detecting the computer system event, provide a user interface corresponding to the computer system event;
   receive a user input corresponding to a request for assistance with the computer system event via the user interface;
   in response to receiving the user input, create a uniform resource locator (URL) comprising an address corresponding to a search engine Web page, a parameter comprising a description of the computer system event, a plurality of targeted search terms, and a unique descriptor associated with the computer system event for targeting an advertisement from at least one advertiser to be displayed in a search result of the search engine Web page; and
   send the URL to a Web browser residing on the computing device.

6. The optical disk, a magnetic storage device, or a solid state storage device of claim 5, wherein causing the computer to detect the computer system event comprises causing the computer to detect an event notification dialog box displayed by an operating system or third party application executing on the computing device.

7. The optical disk, a magnetic storage device, or a solid state storage device of claim 6, wherein causing the computer to provide the user interface corresponding to the computer system event comprises modifying the event notification dialog box to display a selectable assistance request button on the event notification dialog box that is operative to submit the user input corresponding to the request for assistance.

8. The optical disk, a magnetic storage device, or a solid state storage device of claim 5, wherein causing the computer to detect the computer system event comprises causing the computer to:
   detect the computer system event;
   determine that the computer system event comprises one of a plurality of like computer system events;
   determine that the plurality of like computer system events exceed a threshold number of events in a given period of time; and
   in response to determining that the plurality of like computer system events exceed a threshold number of events in a given period of time, provide the user interface comprising an event assistance dialog box.

9. The optical disk, a magnetic storage device, or a solid state storage device of claim 5, further comprising computer executable instructions stored thereon which, when executed by a computer, cause the Web browser to render the search engine Web page, populate a search field of the search engine Web page with the plurality of targeted search terms, and select the advertisement associated with an entity providing a bid on the unique descriptor.

10. The optical disk, a magnetic storage device, or a solid state storage device of claim 9, further comprising computer executable instructions stored thereon which, when executed by a computer, cause the computer to:

receive a selection of a search control;
retrieve Web content corresponding to the plurality of search terms; and
display a plurality of links corresponding to the Web content.

11. The optical disk, a magnetic storage device, or a solid state storage device of claim 5, wherein the computer system event comprises a computing device hardware or software error.

12. The optical disk, a magnetic storage device, or a solid state storage device of claim 5, further comprising computer executable instructions stored thereon which, when executed by a computer, cause the computer to select the advertisement to display on the search engine Web page from a plurality of advertisements according to bidding results associated with the unique descriptor.

13. The optical disk, a magnetic storage device, or a solid state storage device of claim 5, wherein the unique descriptor comprises geographic data corresponding to a location of the computing device.

14. An optical disk, a magnetic storage device, or a solid state storage device having computer executable instructions stored thereon which, when executed by a computer, cause the computer to:

detect a computer system event on a computing device utilizing an event extraction module of a plurality of event extraction modules, each event extraction module comprising computer executable instructions operative to detect a specified type of computer system event;
in response to detecting the computer system event, provide a user interface corresponding to the computer system event;
receive a user input corresponding to a request for assistance with the computer system event via the user interface;
in response to receiving the user input, create a uniform resource locator (URL) comprising an address corresponding to a search engine Web page, a plurality of targeted search terms for the search engine Web page corresponding to the computer system event for populating a search term field of the search engine Web page, a unique descriptor corresponding to the computer system event for targeting an advertisement from at least one advertiser to be displayed in a search result of the search engine Web page and a parameter comprising a description of the computer system event; and
send the URL to a Web browser residing on the computing device.

15. The optical disk, a magnetic storage device, or a solid state storage device of claim 14, wherein the event extraction module utilized to detect the computer system event comprises computer executable instructions operative to detect an event notification dialog box displayed by an operating system or third party application executing on the computing device.

16. The optical disk, a magnetic storage device, or a solid state storage device of claim 14, wherein causing the computer to detect the computer system event utilizing the event extraction module comprises utilizing the event extraction module to:

detect the computer system event;
determine that the computer system event comprises one of a plurality of like computer system events;
determine that the plurality of like computer system events exceed a threshold number of events in a given period of time; and
in response to determining that the plurality of like computer system events exceed a threshold number of events in a given period of time, provide the user interface comprising an event assistance dialog box.

17. The optical disk, a magnetic storage device, or a solid state storage device of claim 14, wherein the unique descriptor is used to select the advertisement for display according to a bid placed on the unique descriptor.

* * * * *